(12) United States Patent
Nonato De Paula et al.

(10) Patent No.: US 10,503,158 B2
(45) Date of Patent: Dec. 10, 2019

(54) SYSTEM AND METHOD FOR RECONSTRUCTING AND AUGMENTING HIGH FREQUENCY DATA

(71) Applicant: General Electric Company, Schenectady, NY (US)

(72) Inventors: Fabio Nonato De Paula, Niskayuna, NY (US); Balajee Ananthasayanam, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 546 days.

(21) Appl. No.: 15/378,783

(22) Filed: Dec. 14, 2016

(65) Prior Publication Data

US 2018/0165387 A1 Jun. 14, 2018

(51) Int. Cl.
G05B 23/02 (2006.01)
(52) U.S. Cl.
CPC .................. *G05B 23/0221* (2013.01)
(58) Field of Classification Search
CPC .................................................. G05B 23/0221
USPC ................................................................ 703/2
See application file for complete search history.

(56) References Cited

U.S. PATENT DOCUMENTS

| 6,310,974 | B1 | 10/2001 | Persiantsev et al. |
| 7,379,782 | B1* | 5/2008 | Cocco .................... G06Q 10/06 700/103 |
| 8,005,581 | B2 | 8/2011 | Beacham |
| 9,785,719 | B2* | 10/2017 | Ma .......................... G06Q 30/00 |
| 2005/0239432 | A1 | 10/2005 | Wilcox |
| 2006/0018406 | A1 | 1/2006 | Chen et al. |
| 2006/0167655 | A1* | 7/2006 | Barrow ................ G06K 9/6298 702/181 |

(Continued)

OTHER PUBLICATIONS

Wang, Degjiang et al., "Lamb Wave-Based Structural Health Monitoring for Aircraft Riveted Lap Joint", Prognostics and System Health Management Conference (PHM), Oct. 21-23, 2015, 7pgs.

(Continued)

*Primary Examiner* — Juan C Ochoa
(74) *Attorney, Agent, or Firm* — Buckley, Maschoff & Talwalkar, LLC

(57) ABSTRACT

A method for augmenting low frequency rate data includes obtaining mechanical system operational data at a first and a second frequency rate, the first rate larger than the second rate, computing time intervals contained in the data, extracting respective samples of first and second frequency data, calculating individual cumulative values, resampling the first frequency rate data to simulate data at the second frequency rate, computing a multiplication factor, applying probabilistic model to the resampled first frequency data using the multiplication factor and rules, algorithms, and/or formulations, combining the resampled first frequency rate data with the second frequency rate data, analyzing the synthesized data set to determine if the mechanical system is viable to operate, and if the determination indicates an approaching end to the operational viability providing an indication to a control processor of the mechanical system. A system and non-transitory computer-readable medium are disclosed.

16 Claims, 4 Drawing Sheets

(56) References Cited

U.S. PATENT DOCUMENTS

2013/0197875 A1* 8/2013 Shirley ............ G01R 31/31718
703/2
2014/0077977 A1 3/2014 Klejsa et al.
2017/0161638 A1* 6/2017 Garagic ................ G06N 7/005

OTHER PUBLICATIONS

Guan, Xuefei et al., "Turbine Fatigue Reliability and Life Assessment Using Ultrasonic Inspection: Data Acquisition, Interpretation, and Probabilistic Modelling", Quality and Reliability Management and Its Applications, Nov. 2015, DOI:10.1007/978-1-4471-6778-5_15, (pp. 415-434, 20 total pages).

Nusrath, Khadeeja et al., "Drag Assessment of a High Performance Aircraft Using System Identification Techniques", 2016 Indian Control Conference (ICC), Indian Institute of Technology Hyderabad, India, Jan. 4-6, 2016, (pp. 418-425, 8 total pages).

Chidean, Mihaela I. et al., "Energy Efficiency and Quality of Data Reconstruction Through Data-Coupled Clustering or Self-Organized Large-Scale WSNs", IEEE Sensors Journal, vol. 16, No. 12, Jun. 15, 2016, DOI:10.1109/USEN.2016.2551466, (pp. 5010-5020, 11 total pages).

Bui-Thanh, T. et al., "Aerodynamic Data Reconstruction and Inverse Design using Proper Orthogonal Decomposition", AIAA 16th Computational Fluid Dynamics Conference, Orlando, FL, Jun. 23-26, 2003, (pp. 1505-1516, 12 total pages).

* cited by examiner

SYSTEM AND METHOD FOR RECONSTRUCTING AND AUGMENTING HIGH FREQUENCY DATA

BACKGROUND

Operational data is an important input used in estimating current damage level and remaining useful life of mechanical components. The overall useful life of certain items is dependent on the cumulative wear associated with individual subassemblies and/or components within the item.

Most industrial sensors capture data at low frequencies. However, many events occur over very small time periods, with wear accumulating in small increments over long operational times. Hence, it is important to sample signals at high frequency over a long period of time. High frequency sampling over long periods is seldom possible due to prohibitive costs.

Time series data analysis traditionally can rely on the available time series sampling frequency. Events occurring at frequencies higher than half of the sampling frequency are bound to be misrepresented by the sampled signal. In some instances, higher than normal sampling frequency data is available in order to record anomalies or specific stages of operation. Other methodologies that rely on frequency analysis are suitable only to signals with harmonic content. Some industrial application signals are random in nature or highly dependent on environmental effects.

For example, turbines (e.g., a turbine engine for aircraft, locomotive, power generation, etc.) can include variable stator vanes (VSV) that are angularly adjustable to control pressure ratios within the turbine compressor. A VSV wear prediction is highly correlated with accumulated change in angular position. Conventional collection of operational data is not necessarily collected at a frequency rate high enough to enable accurate estimation of VSV wear.

DETAILED DESCRIPTION

Embodying systems and methods provide the capability to simulate and/or reconstruct high frequency cumulative data from information obtained by low frequency data sampling. In accordance with embodiments, probabilistic models combine the low frequency data samples with system behavior knowledge to augment information missing from the target high frequency data.

Embodying probabilistic models can correct the magnitude of cumulative signals used for prognostics. Embodying systems and methods eliminate the need for adding expensive new sensors to capture high frequency data; eliminate increased demand on system resources to store high frequency data samples; and is implementable by existing sensors in deployed devices, which capture data at lower frequencies.

Embodying systems and methods incorporate probabilistic data-reconstruction techniques for cumulative random signals. Implementation of these embodying techniques can optimize information availability from legacy machines without addition of extra data logging hardware and bandwidth. The embodying models can utilize the synthesized high frequency data samples in evaluating asset operation, performance, and wear relying on low frequency data samples to obtain the synthesized high frequency cumulative data.

Figure 1:
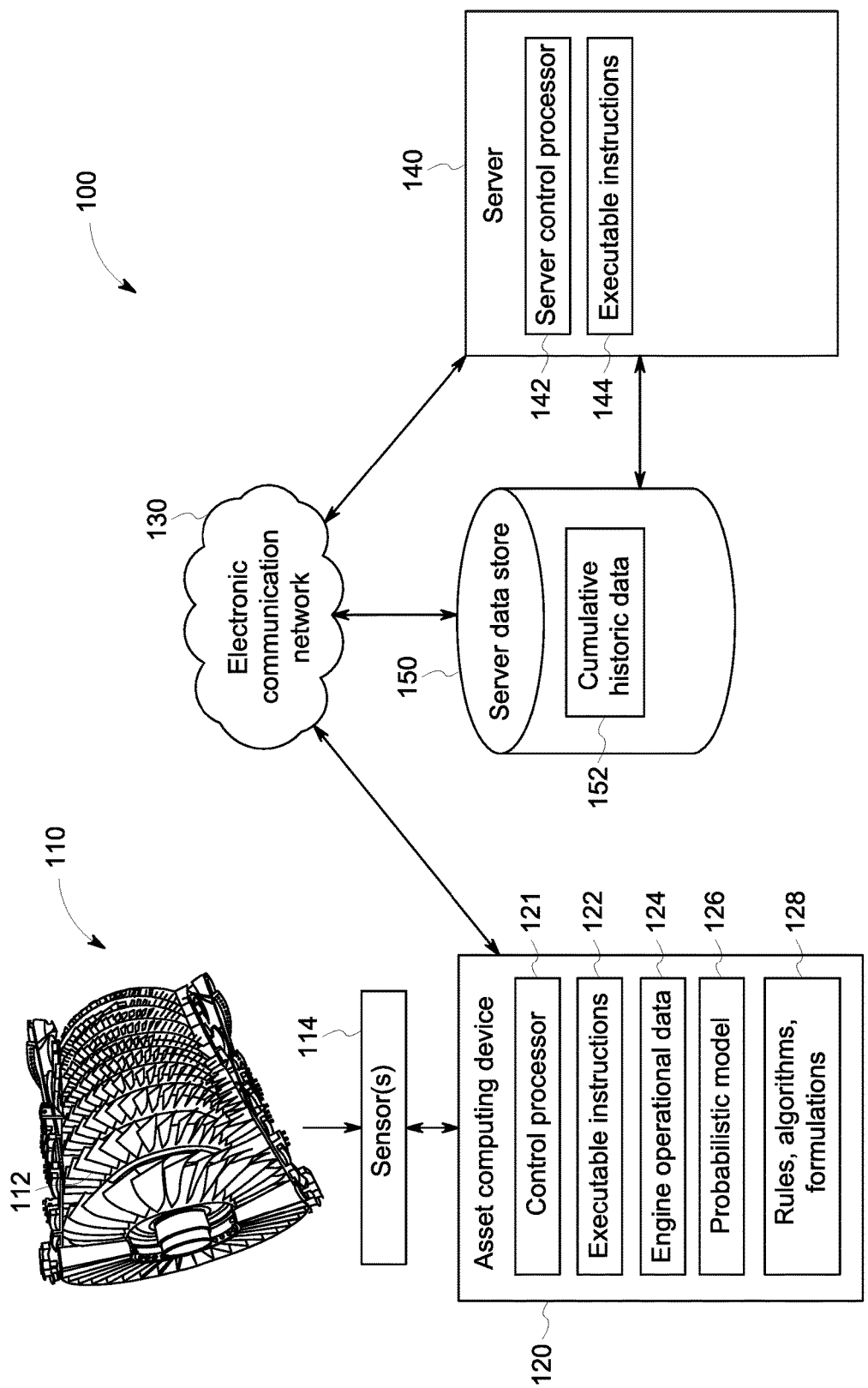
FIG. 1 depicts a system for reconstruction and augmentation of high frequency cumulative data in accordance with embodiments.

FIG. 1 depicts system 100 for reconstruction and augmentation of cumulative data based on low and high frequency data points in accordance with embodiments. System 100 can include turbine 110 (e.g., a turbine engine for aircraft, locomotive, power generation, etc.). For purposes of this discussion one turbine is illustrated in FIG. 1, however it is readily understood that system 100 can include multiple turbines. Turbine 110 can include one or more VSV sets 112 radially arranged along a common axis. Within turbine 110 are disposed sensor(s) 114, which monitor wear on the turbine vanes. Sensor(s) 114 provide VSV travel data to asset computing device 120. The frequency of data sampling by the sensors can be varied in proportion to turbine rotational demand. For example, an aircraft turbine engine can have higher data sampling frequency during takeoff, climbing, and descent flight intervals; at cruising altitude, the data sampling frequency of an aircraft turbine can be at a much lower rate.

Asset computing device 120 can include control processor 121 that executes executable instructions 122 to control other modules of the asset computing device. In some implementations, the asset computing device can be embedded within turbine 110.

Engine operational data 124 can include sensor data obtained at low and high frequency rates—e.g., at about 16 Hz and about 1 Hz (although other frequency rates are within scope of this disclosure). The engine operational data can include the cumulative angular rotation or travel undergone during turbine operation. It is this angular rotation that can cause damage to bushings within the VSV system. Travel estimate is a strong function of data collection rate and hence accuracy of damage prediction to components strongly depends on the accuracy of the data.

The data collection frequency can vary during turbine operation several times. For example, a higher collection rate can occur during turbine operation phases with large shifts in turbine rotational speed (e.g., takeoff, climb, descent of an aircraft; peak power demand periods for a generator; steep ascent/descent of a locomotive; high wind conditions for a wind turbine; etc.). A lower collection rate can occur during turbine operation phases with an about constant turbine rotational speed, where the about constant speed is identified based on a predetermined time period.

The VSV system can accrue considerable amounts of damage during long constant speed operation (for example, for aircraft turbine engines the constant rotation occurs during the cruise phase). Because these constant speed periods are sampled (for the most part) at low frequency rates, supplementing and/or correcting the low frequency data points is vital for prediction of VSV wear.

In accordance with embodiments, probabilistic model 126 can be applied to data values accumulated at lower frequency rates to supplement and/or correct measured data values. The probabilistic model can apply knowledge of VSV data patterns from data collected at higher frequency rates to arrive at correction factors for the lower frequency data. Embodying probabilistic models can effectively quantify variability of the high frequency sampled data, and include cumulative variation on low frequency sampled data in order to represent the high frequency variability through the correction factor. Probabilistic model 126 can implement rules, algorithms, and/or formulations 128. These rules, algorithms, and/or formulations can quantify variation through various techniques, such as parametric and nonparametric probability density function fit, etc.

In accordance with embodiments, embodying methods can be applied to any type of turbine having VSVs. Embodying methods are not so limited, and can be applied to any variable that is cumulative in nature, which is sampled at varying frequencies, for any type of machinery where a damage matrix can be correlated to cumulative behavior of the sampled variable.

For purposes of disclosure, the following discussion applies to an aircraft turbine engine with VSVs. In accordance with embodiments, data can be corrected to represent the accumulated travel of VSVs based on engine operation data 124 obtained from sensors 114 located in the aircraft turbine engine.

In accordance with embodiments, asset computing device 120 can be in communication with server 140 across electronic communication network 130. The electronic communication network can be, can comprise, or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that techniques and systems disclosed herein are not limited by the nature of network 130.

Server 140 can include at least one server control processor 142 configured to support embodying reconstruction and augmentation of high frequency data based on low frequency data points operations by executing executable instructions 144 accessible by the server control processor. Data store 150 can include cumulative historic data 152 that contains records of prior accumulated data. This cumulative data can be organized by unique identifiers associated with individual turbines. In accordance with embodiments, probabilistic model 126 can access the cumulative historic data for records of a particular individual turbine, or a class of turbine types. This accessed cumulative historic data can be used by the probabilistic model to obtain known VSV data patterns of higher frequency collection rates. These known VSV data patterns can then be used when applying the rules, algorithms, and/or formulas by the probabilistic model to arrive at data points between the lower frequency data.

Figure 2:
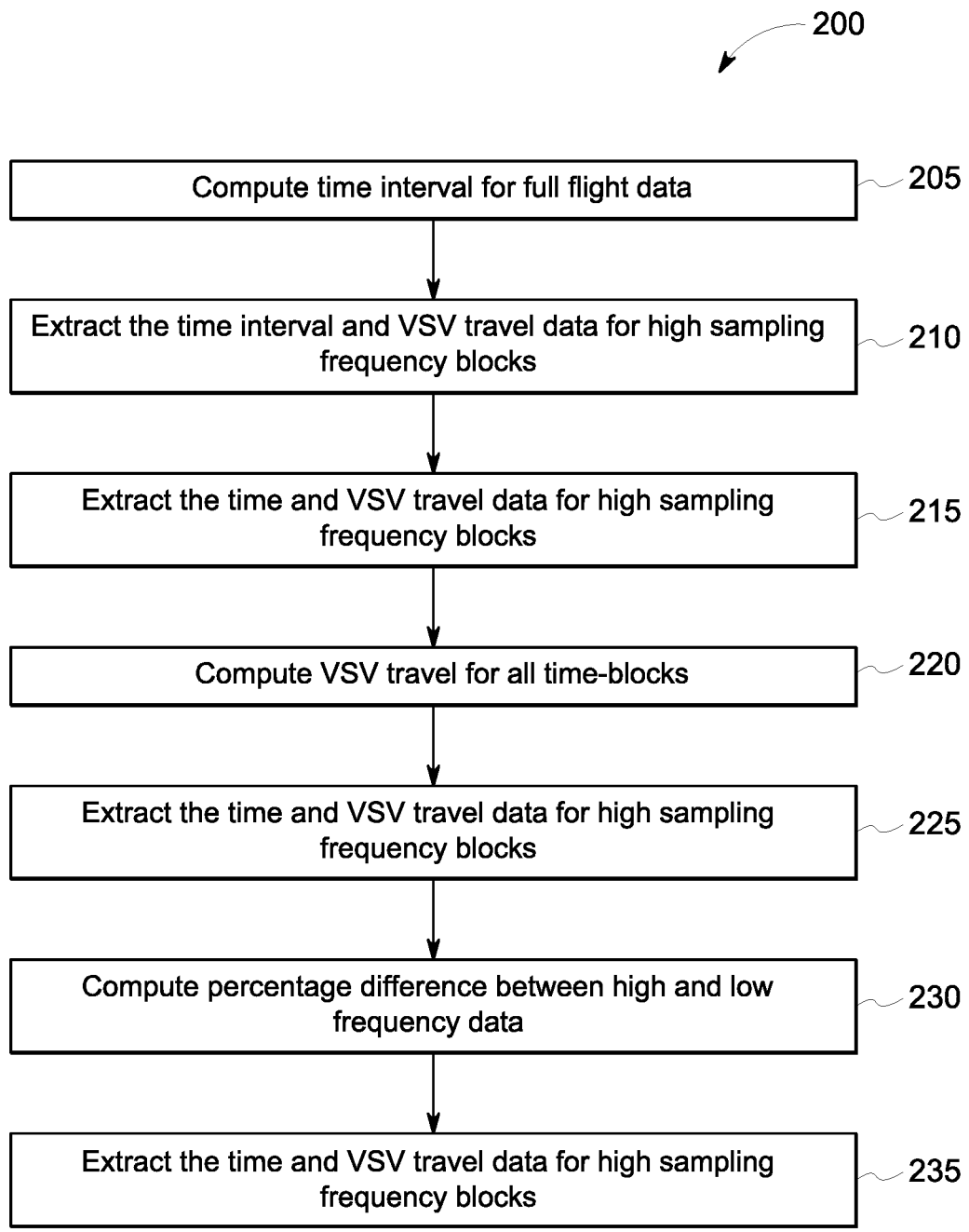
FIG. 2 depicts a flowchart of a process for quantifying discrepancy in vane travel data in accordance with embodiments.

FIG. 2 depicts a flowchart of process 200 for quantifying discrepancy in VSV travel data between low frequency sampled data and high frequency sampled data in accordance with embodiments. The discrepancy between the sampled data of different frequency sampling rates can be used to identify characteristics of the high frequency data, which can be used as input by probabilistic model 126 to arrive at correction factors for the lower frequency data.

Figure 3:
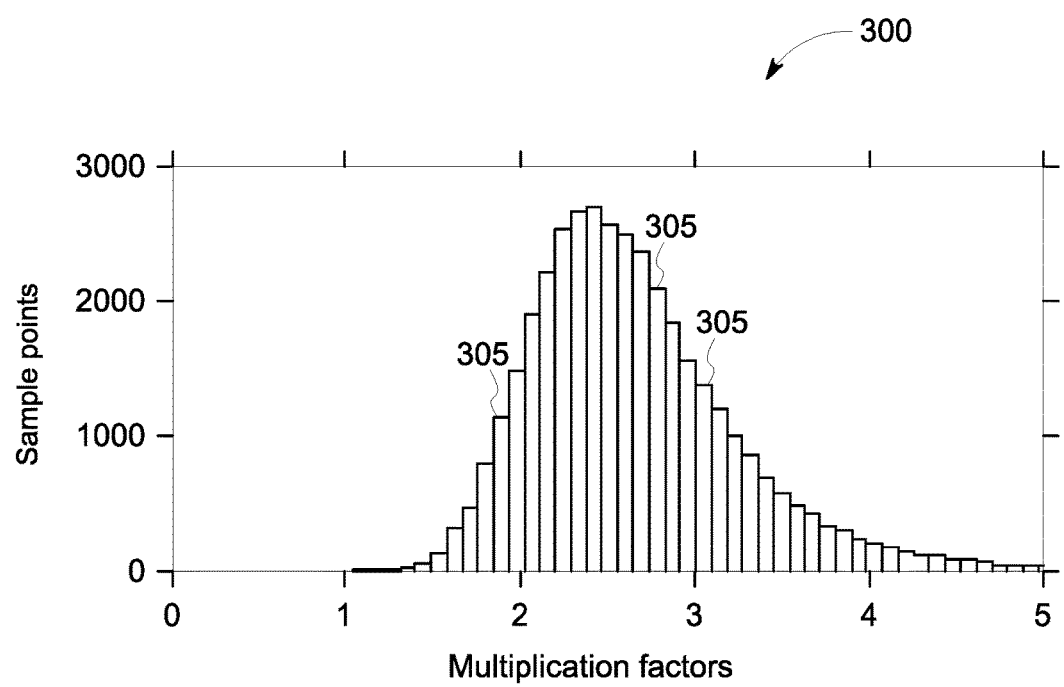
FIG. 3 depicts a sample histogram of multiplication factors for the VSV travel of sampled points of a sample flight in accordance with embodiments.

The time intervals for the sampled data is computed in step 205 in order to identify the various sampling frequencies of the engine operational data 124. The time intervals and VSV travel data for high sample frequency blocks is extracted, step 210. The time intervals and VSV travel data for those high sample frequency blocks occurring before a shift to low sampling frequency are extracted, step 215. The cumulative VSV travel for all time blocks is computed, step 220. At step 225, each data block is resampled to a lower frequency rate, and the cumulative VSV travel is calculated. A delta percentage between high sampling and low sampling rate data is calculated, step 230. The delta percentage can be calculated by Equation 1:

$$\text{Percentage Delta} = ((T_{F,high} - T_{F,low})/T_{F,low})/100 \qquad \text{EQ. 1}$$

Where $T_{F,high}$ is the cumulative high frequency sample rate VSV travel; and $T_{F,low}$ is the cumulative low frequency sample rate VSV travel A multiplication factor can be computed, step 235, from the difference between high and low frequency sampling rate data. FIG. 3 depicts a sample histogram 300 of the multiplication factors for the VSV travel for all sampled points 305 of a representative sample flight in accordance with embodiments. The multiplication factor can be calculated by Equation 2:

$$\text{Multiplication Factor} = 1 + ((T_{F,high} - T_{F,low})/T_{F,low}) \qquad \text{EQ. 2}$$

Figure 4:
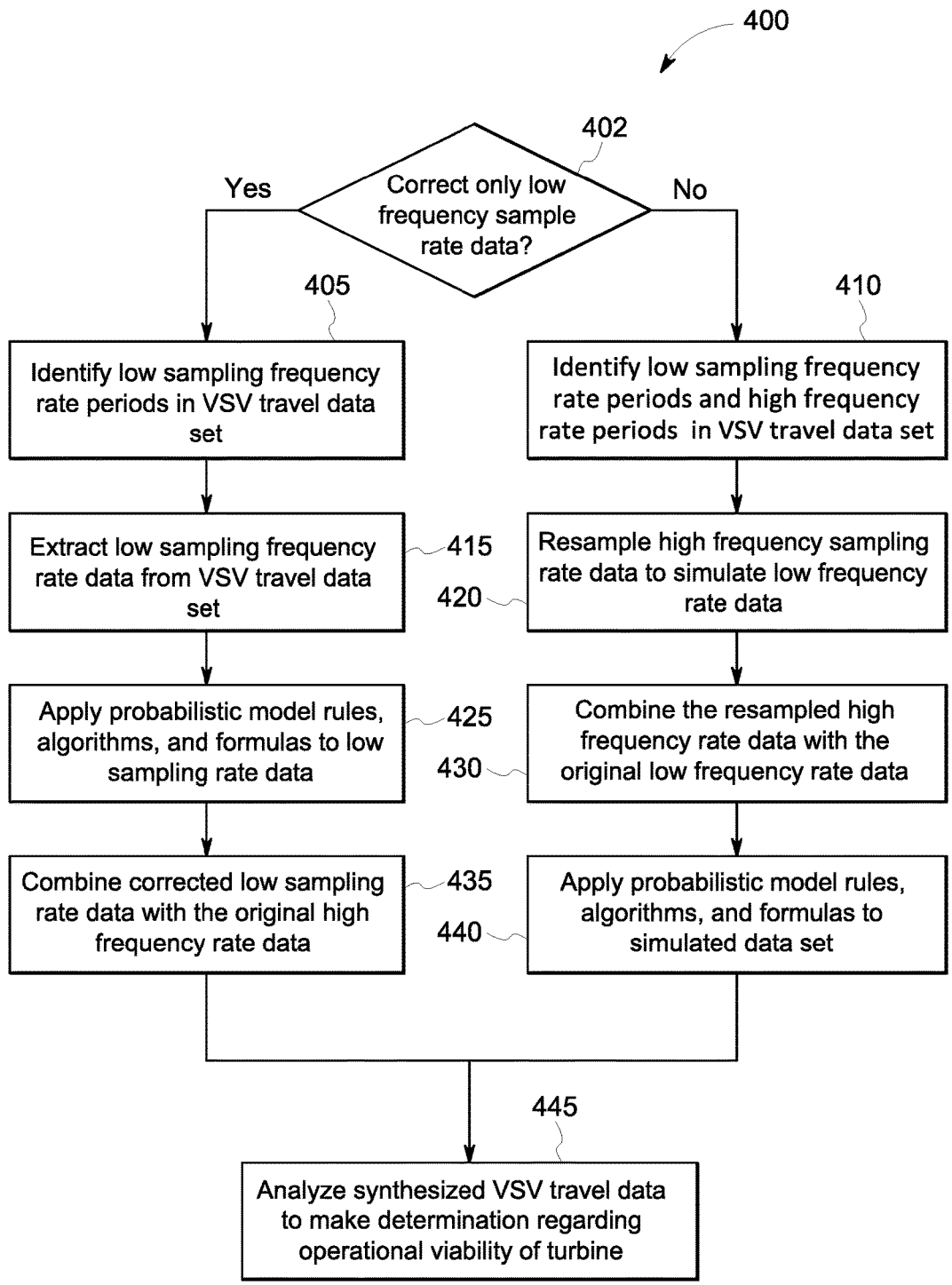
FIG. 4 depicts a flowchart of a process for augmenting low sampling frequency rate data to mimic high sampling frequency rate data in accordance with embodiments.

FIG. 4 depicts process 400 for augmenting low sampling frequency rate data to mimic high sampling frequency rate data in accordance with embodiments. In accordance with embodiments, correction of VSV travel can be done by scaling up the VSV travel contribution of original low frequency data blocks by the obtained multiplication factor. This correction to the VSV travel data can be implemented by probabilistic model 126 in at least in two different approach.

A determination is made, step 402, as to whether correction of VSV travel data is made on just the low frequency sample rate data, or by down sampling and correcting the entire sample data set. If the former approach is being implemented, process 400 continues to step 405. If the latter approach is being implemented, process 400 continues to step 410.

At step 405 low frequency sampling rate periods are identified in the VSV travel data set. The data from these low frequency sampling periods is extracted, step 415. Rules, algorithms, and/or formulas are applied, step 425, to the low frequency rate data by probabilistic model 126. The probabilistic model corrects the low sampling frequency data by multiplying the accumulated VSV travel by the multiplying factor. The corrected low sampling rate data is combined, step 435, with the original high frequency sampling rate data to obtain a synthesized cumulative VSV travel data. The synthesized cumulative VSV travel is analyzed, step 445, to make a determination regarding the operational viability of the turbine.

The amount of travel undergone by the VSV correlates to the wear pattern of individual bushings in the VSV system. If the viability determination results in a caution condition, an indication can be sent to a control processor controlling the turbine that a maintenance operation is needed for the turbine. In cases of extreme wear and a determination of severe danger, the indication can include a turbine lockout that can prohibit operation of the turbine until it is inspected, and the lockout indication cleared.

With regard to FIG. 4, periods of low sampling rates and high sampling rates can be identified, step 410, in the VSV travel data set. The VSV travel data from the high sampling rate periods is resampled, step 420, to simulate low frequency rate data. The resampling can include, but is not limited to, for instance, removing data samples from the high frequency data periods at a ratio proportionate to the high/low sampling rates (e.g., for rates of 16 Hz and 1 Hz, only every 16th data element need be retained).

The resampled high frequency data is combined, step 430, with the original low frequency sampling rate data. Rules, algorithms, and/or formulas are applied, step 440, to the combined data set by probabilistic model 126. The probabilistic model corrects the low sampling frequency data by multiplying the accumulated VSV travel by the multiplying factor. The synthesized cumulative VSV travel set is analyzed, step 445, to make a determination regarding the operational viability of the turbine.

In accordance with embodiments, probabilistic model 126 can reintroduce data variability to the cumulative VSV travel data set. The data variability can be achieved by conditional sampling of inferred probabilistic behavior. A parametric, or a nonparametric probability density function (PDF) correction factor can be computed from observing multiplication factors for a given signal, or grouping of signals. In accordance with implementations, low frequency sampling blocks can be corrected by a slightly different multiplication factor based on a correlated PDF. The sampling can even be made conditional on other variables, as the obtained multiplication factor can be associated with other variables concurrently sampled at higher frequency rates.

The VSV travel data collection rate is dictated by practical considerations related to the amount of available storage for sensor data during extended turbine operations. Embodying systems and methods provide an improvement in the quality of calculated parameters used for predictive determinations on the operational viability of the turbine. This improvement is achieved without a significant change in the conventional methods of sensor data collection. Thus, reducing and/or minimizing an impact on legacy and future deployed turbine systems. Embodying systems and methods offer a significant technological and commercial advantage by reducing or even eliminating the need the need to install expensive sensors and data acquisition systems, while maximizing value extraction from existing legacy data systems.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as a method for simulating and/or reconstructing cumulative high frequency data from information obtained by low frequency data sampling to create predictive data regarding operational viability of deployed turbines, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for augmenting low frequency sampling rate data, the method comprising:
   obtaining a data set containing data sampled at a first frequency rate and a second frequency rate, the first frequency rate being larger than the second frequency rate, the data set representing operational status of a mechanical system;
   computing time intervals contained in the data set;
   extracting data sampled at the first frequency rate;
   extracting data sampled at the second frequency rate;
   calculating a cumulative data value for individual values in the data set;
   resampling the first frequency rate data to simulate data values at the second frequency rate;
   computing a multiplication factor based on a difference between first frequency rate data and second frequency rate data cumulative sample times; and
   applying probabilistic model rules to the resampled first frequency rate data using the multiplication factor in combination with at least one of rules, algorithms, and formulations to create a synthesized data set;
   combining the resampled first frequency rate data with the second frequency rate data;
   analyzing the synthesized data set to determine an operational viability of the mechanical system; and
   if the determination indicates an approaching end to the operational viability providing an indication to a control processor in control of the mechanical system.

2. The method of claim 1, including the resampling data step including a determination of whether second frequency rate data is to be corrected.

3. The method of claim 2, including the steps of:
   resampling the second frequency rate data to simulate a rate equal to the first frequency rate data;
   combining the resampled second frequency rate data with data sampled at the first frequency rate to create a second synthesized data set;
   applying the probabilistic model rules to the second synthesized data set; and
   analyzing the second synthesized data set to determine a second operational viability of the mechanical system; and
   if the determination of the second operational viability indicates an approaching end to the second operational viability providing an indication to the control processor in control of the mechanical system.

4. The method of claim 3, the resampling the second frequency rate data including applying a resampling selection rate equal to a ratio proportionate to the second frequency rate compared to the first frequency rate.

5. The method of claim 1, including if the operational viability determination indicates a severe danger associated with continued operation of the mechanical system the method including sending a system lockout to the control processor in control of the mechanical system.

6. A non-transitory computer readable medium containing computer-readable instructions stored therein for causing a control processor to perform a method for augmenting low frequency sampling rate data, the method comprising:

obtaining a data set containing data sampled at a first frequency rate and a second frequency rate, the first frequency rate being larger than the second frequency rate, the data set representing operational status of a mechanical system;

computing time intervals contained in the data set;

extracting data sampled at the first frequency rate;

extracting data sampled at the second frequency rate;

calculating a cumulative data value for individual values in the data set;

resampling the first frequency rate data to simulate data values at the second frequency rate;

computing a multiplication factor based on a difference between first frequency rate data and second frequency rate data cumulative sample times; and applying probabilistic model rules to the resampled first frequency rate data using the multiplication factor in combination with at least one of rules, algorithms, and formulations to create a synthesized data set;

combining the resampled first frequency rate data with the second frequency rate data;

analyzing the synthesized data set to determine an operational viability of the mechanical system; and if the determination indicates an approaching end to the operational viability providing an indication to the control processor in control of the mechanical system.

7. The non-transitory computer readable medium of claim 6, including computer-readable instructions that cause the control processor to perform the resampling data step by including a determination of whether second frequency rate data is to be corrected.

8. The non-transitory computer readable medium of claim 7, including computer-readable instructions that cause the control processor to perform the steps of:

resampling the second frequency rate data to simulate a rate equal to the first frequency rate data;

combining the resampled second frequency rate data with data sampled at the first frequency rate to create a second synthesized data set;

applying the probabilistic model rules to the second synthesized data set; and analyzing the second synthesized data set to determine a second operational viability of the mechanical system; and if the determination of the second operational viability indicates an approaching end to the second operational viability providing an indication to the control processor in control of the mechanical system.

9. The non-transitory computer readable medium of claim 8, including computer-readable instructions that cause the control processor to perform the resampling the second frequency rate data by including applying a resampling selection rate equal to a ratio proportionate to the first frequency rate compared to the second frequency rate.

10. The non-transitory computer readable medium of claim 6, including computer-readable instructions that cause the control processor, if the operational viability determination indicates a severe danger associated with continued operation of the mechanical system, to perform the step of sending a system lockout to the control processor in control of the mechanical system.

11. A system for augmenting low frequency sampling rate data, the system comprising:

a mechanical system having at least one group of components subject to effects of long term wear;

one or more sensors disposed in the mechanical system, the sensors monitoring a property of at least one of the groups of components;

the sensors providing data to an asset computing device associated with the mechanical system, the asset computing device including a control processor configured to control operation of the mechanical system;

the control processor configured to access executable instructions that cause the control processor to perform the steps of:

obtaining a data set containing data sampled at a first frequency rate and a second frequency rate, the first frequency rate being larger than the second frequency rate, the data set representing operational status of the mechanical system;

computing time intervals contained in the data set;

extracting data sampled at the first frequency rate;

extracting data sampled at the second frequency rate;

calculating a cumulative data value for individual values in the data set;

resampling the first frequency rate data to simulate data values at the second frequency rate;

computing a multiplication factor based on a difference between first frequency rate data and second frequency rate data cumulative sample times;

applying probabilistic model rules to the resampled first frequency rate data using the multiplication factor in combination with at least one of rules, algorithms, and formulations to create a synthesized data set;

combining the resampled first frequency rate data with the second frequency rate data;

analyzing the synthesized data set to determine an operational viability of the mechanical system; and if the determination of the second operational viability indicates an approaching end to the operational viability providing an indication to the control processor in control of the mechanical system.

12. The system of claim 11, the executable instructions causing the control processor to perform the resampling data step by including a determination of whether second frequency rate data is to be corrected.

13. The system of claim 12, the executable instructions causing the control processor to perform the steps of:

resampling the second frequency rate data to simulate a rate equal to the first frequency rate data;

combining the resampled second frequency rate data with data sampled at the first frequency rate to create a second synthesized data set;

applying the probabilistic model rules to the second synthesized data set; and analyzing the second synthesized data set to determine a second operational viability of the mechanical system; and if the determination indicates an approaching end to the second operational viability providing an indication to the control processor in control of the mechanical system.

14. The system of claim 13, the executable instructions causing the control processor to perform the resampling the second frequency rate data by applying a resampling selection rate equal to a ratio proportionate to the first frequency rate compared to the second frequency rate.

15. The system of claim 11, the executable instructions causing the control processor to, if the operational viability determination indicates a severe danger associated with continued operation of the mechanical system, perform the step of sending a system lockout to the control processor in control of the mechanical system.

16. The system of claim 11, including the mechanical system being a turbine having variable stator vanes, the data set representing a travel distance of the variable stator vanes, and the travel distance being a surrogate indicator of turbine component wear.

* * * * *